(No Model.)
F. E. KOHLER.
LAWN SPRINKLER.
No. 543,993. Patented Aug. 6, 1895.
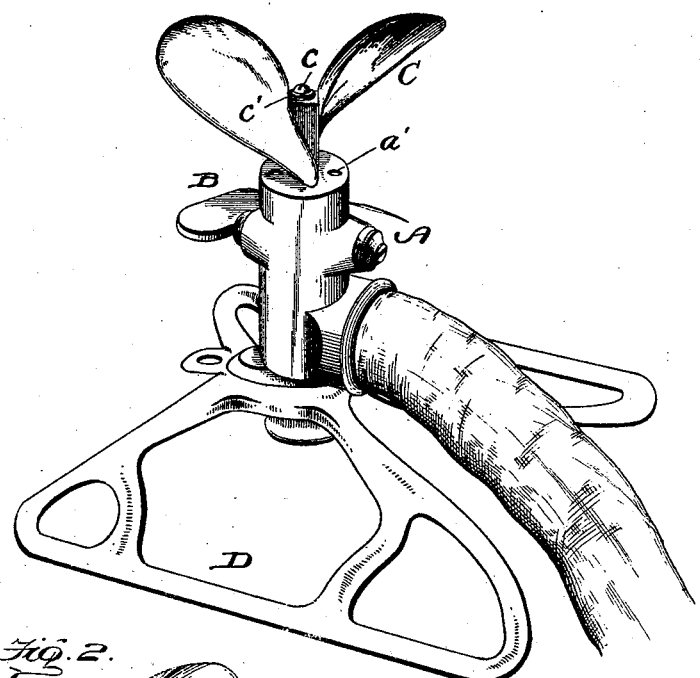
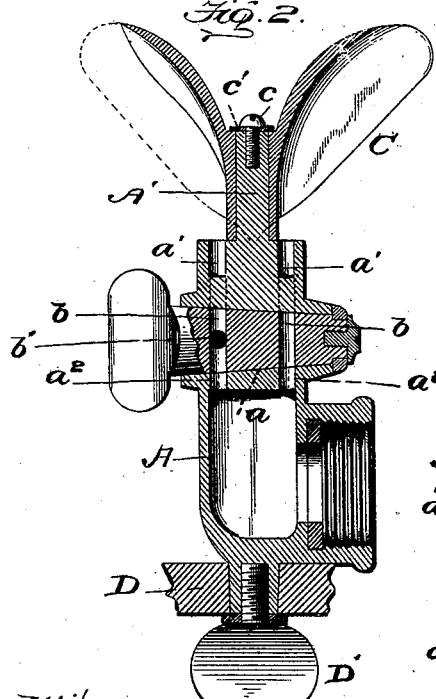
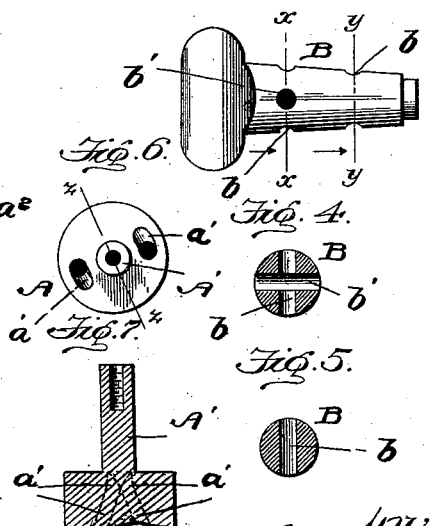
Witnesses
Wm E Dashiell
Chas. R. Miller
Inventor
Frederick E. Kohler
By W K Miller
Atty.

UNITED STATES PATENT OFFICE.

FREDERICK E. KOHLER, OF CANTON, OHIO.

LAWN-SPRINKLER.

SPECIFICATION forming part of Letters Patent No. 543,993, dated August 6, 1895.

Application filed December 17, 1894. Serial No. 532,014. (No model.)

*To all whom it may concern:*

Be it known that I, FREDERICK E. KOHLER, a citizen of the United States, and a resident of Canton, county of Stark, State of Ohio, have invented a new and useful Improvement in Lawn-Sprinklers, of which the following is a full, clear, and exact description, reference being had to the accompanying drawings, making part of this specification.

My invention relates to improvements in lawn sprinklers or sprayers, and more particularly to that class of sprinklers in which the water is directed against a propeller-like sprayer and deflected therefrom in a finely-atomized spray or sheet.

The object of the invention is to provide a device of this character which may be so regulated as to either throw a circular or umbrella-like sheet about the sprayer or a semicircular sheet to one side thereof, as may be desired.

With these objects in view the invention consists in certain features of construction and combination of parts, which will be hereinafter described.

In spraying lawns with this form of sprayer it is oftentimes desired to direct the water to only one side of the sprayer, especially where the device is placed on the border of the lawn, and it is with this object in view that I have constructed the sprayer to spray the water either in a circular or semicircular sheet.

Figure 1 of the accompanying drawings is a view in perspective of the sprayer supported upon a suitable base and connected with a hose. Fig. 2 is a vertical sectional view of the same and a fragment of the base, showing the plug turned to cause the water to be discharged in a circular or umbrella-like sheet. Fig. 3 is a detailed side elevation of the turn-plug. Fig. 4 is a cross-section on line $x\,x$, Fig. 3. Fig. 5 is a similar view on line $y\,y$, same figure. Fig. 6 is a plan view of the upper side of the plug-casing. Fig. 7 is a sectional view on line $z\,z$, Fig. 6.

In the accompanying drawings like letters of reference denote corresponding parts in the several views.

A denotes the plug-casing provided with a nipple, to which the hose is attached, and with an upright extension having a plug-seat $a$, from which lead diagonally upward in opposite directions two passages $a'\,a'$ and downward passages $a^2\,a^2$, the passage of each set being in line with each other and adapted to communicate.

B denotes the turn-plug, properly secured in its seat and provided with openings or ports $b\,b$, which are adapted to register with the passages $a'\,a'\,a^2\,a^2$ at the same time, and is further provided with a third port $b'$, which is adapted to register with one of the passages $a'\,a^2$. A stem A' projects upward from the upright extension of the plug-casing, and upon this stem is mounted, to freely rotate, a propeller-like sprayer-wheel C, which, for convenience of reference, I will term the "spinner." The spinner is held in place on the stem preferably by means of a screw $c$ and washer $c'$, which will permit the spinner to freely rotate when the streams of water from the passages $a'\,a'$ are directed against the blades thereof.

D denotes the base, to which the casing is attached by a set-screw D'.

In operation, to throw a circular or umbrella-like spray the plug is turned so that its two ports $b\,b$ register with the passages $a'\,a'$ and $a^2\,a^2$, through which the water flows under pressure to and against the blades of the spinner, striking the blades tangentially to the axis therein.

The impact or pressure of the water causes the spinner to be rapidly rotated, thus atomizing the water and throwing it upward and outward in a fine circular or umbrella-like spray.

I have found in practice that by elongating the outer ends of the passages $a'\,a'$ I secure a more satisfactory result, in that the streams of water are directed against the blades of the spinner in a long narrow stream and strike the blades tangentially to the axis of their rotation, and a more rapid revolution is imparted to the spinner, consequently increasing the area of the spray.

When the device is placed near the border of the lawn, or close to a porch or building which it is not desired to sprinkle, by turning the plug so that its port $b'$ will register with one of each set of passages $a'\,a^2$ the water will be directed against the spinner-wheel at one side, which will spray or atomize it in a semicircular sheet to one side only of the device.

From the foregoing description, taken in connection with the drawings, the construction and operation of the invention will be readily understood without requiring further explanation. I would have it understood, however, that I do not limit myself to the precise construction herein shown and described, as it is evident that slight changes may be made without departing from the spirit and scope of the invention.

Having thus fully described my invention, what I claim, and desire to secure by Letters Patent of the United States, is—

1. A lawn sprayer comprising in combination, a plug casing, passages extending diagonally therethrough, a spinner mounted to freely rotate above said casing, and a turn plug, operating in said casing, said plug provided with two ports which are adapted to be brought simultaneously into register with the said passages, and direct the stream against the spinner, at opposite sides thereof, and further provided with a third port which may be brought into register with but one of the passages, to direct the stream at but one side against the spinner, substantially as described and for the purpose set forth.

2. A lawn sprayer comprising in combination, a casing, having passages extending diagonally therethrough in opposite directions, a sprayer mounted to rotate above the casing, in line, to receive on its blades the streams from said passages, and a valve for controlling the flow of water, substantially as described and for the purpose set forth.

3. A lawn sprayer comprising in combination, a casing having passages extending therethrough, the outlet ends of which are of elliptical form, a spinner mounted to freely rotate above said casing, and receive the impact of the water on its blades, and a valve for controlling the flow of water, substantially as described and for the purpose set forth.

4. A lawn sprayer, comprising in combination, a casing, having oppositely diagonal passages, the outlet ends of which are of elliptical form, a spinner mounted above said casing and to be rotated by the impact of water against the blades, substantially as set forth.

5. The combination with the base, a casing secured thereto, and provided with a hose nipple, a plug seat, passages $a'$, $a'$, $a^2$, $a^2$, the upper ones of which extend diagonally through the casing, and a spindle; a plug secured in said seat and provided with ports $b$ $b$, $b'$, and a spinner journaled upon said spindle above the passages $a'$, $a'$, to receive the impact of the stream or streams of water, and spray the same, substantially as described and for the purpose set forth.

In testimony whereof I have hereunto set my hand this 8th day of December, A. D. 1894.

FREDERICK E. KOHLER.

Witnesses:
CHAS. R. MILLER,
W. K. MILLER.